United States Patent

Kwoka et al.

[11] Patent Number: 6,080,076
[45] Date of Patent: Jun. 27, 2000

[54] MECHANICAL LOCKING DIFFERENTIAL

[75] Inventors: Georg Kwoka, Much; Adrian Chludek, Augustin, both of Germany

[73] Assignee: GKN Viscodrive GmbH, Lohmar, Germany

[21] Appl. No.: 09/192,982

[22] Filed: Nov. 16, 1998

[30] Foreign Application Priority Data

Nov. 17, 1997 [DE] Germany ............... 197 50 834

[51] Int. Cl.$^7$ ................................................ F16H 57/04
[52] U.S. Cl. ................................ 475/160; 475/248
[58] Field of Search ........................... 475/159, 160, 475/248, 252

[56] References Cited

U.S. PATENT DOCUMENTS

| | | | |
|---|---|---|---|
| 4,751,853 | 6/1988 | Dissett | 74/607 X |
| 5,295,923 | 3/1994 | Takefuta | 475/252 |
| 5,556,351 | 9/1996 | Hiraishi et al. | 475/160 |
| 5,620,389 | 4/1997 | Sato | 475/160 X |
| 5,624,344 | 4/1997 | Yehl et al. . | |
| 5,669,844 | 9/1997 | Homan et al. | 475/160 |
| 5,711,737 | 1/1998 | Teraoka et al. | 475/160 |
| 5,885,181 | 3/1999 | Dissett | 475/160 |

FOREIGN PATENT DOCUMENTS

722056A2  11/1996  European Pat. Off. .

Primary Examiner—Charles A Marmor
Assistant Examiner—Ha Ho
Attorney, Agent, or Firm—Francis N. Carten

[57] ABSTRACT

A differential drive has a differential carrier rotatably drivably supported around an axis in a drive housing. Two axle shaft gears are arranged in coaxial bores while being supported around the axis so as to be rotatable relative to the differential carrier. A plurality of differential gears are rotatably supported in axis-parallel cylindrical pockets in the differential carrier and rotate with the differential carrier. A first group of differential gears engage one of the axle shaft gears and a second group of differential gears engage the other one of the axle shaft gears. The axle shaft gears and the differential gears are designed as helical gears. The differential gears, on their tooth heads, rotate in the pockets, and the differential carrier has a central portion with the bores for the axle shaft gears and the pockets for the differential gears. Two cover parts axially close the bores and the pockets. In the central portion, there are provided continuous axis-parallel oil return bores which, by means of connecting grooves in the end faces of the central portion and/or in the inner faces of the cover parts are connected to the open ends of the pockets emerging at the respective end face.

8 Claims, 5 Drawing Sheets

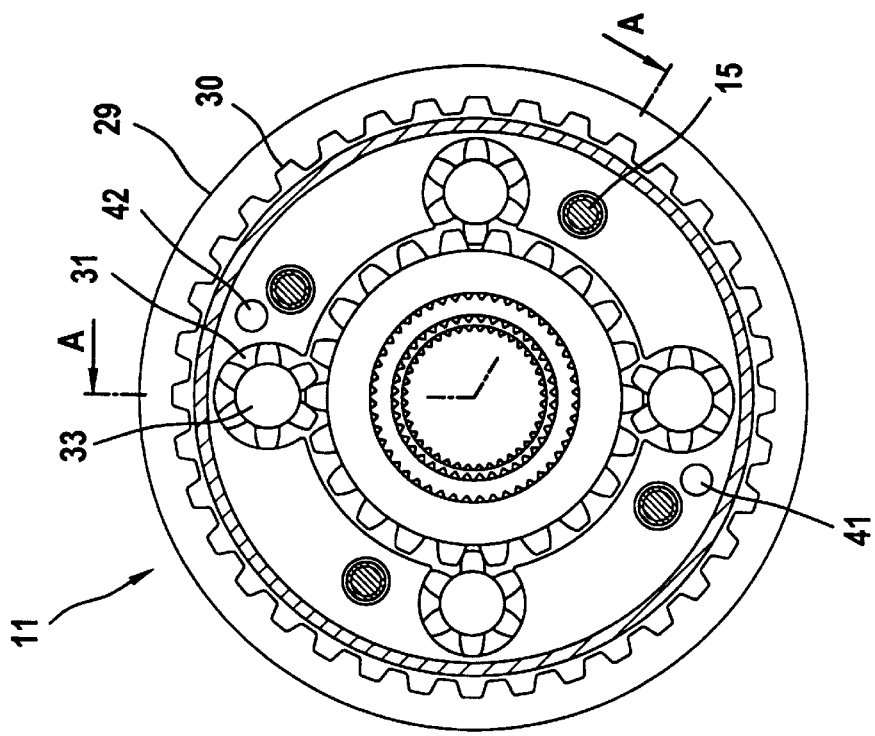
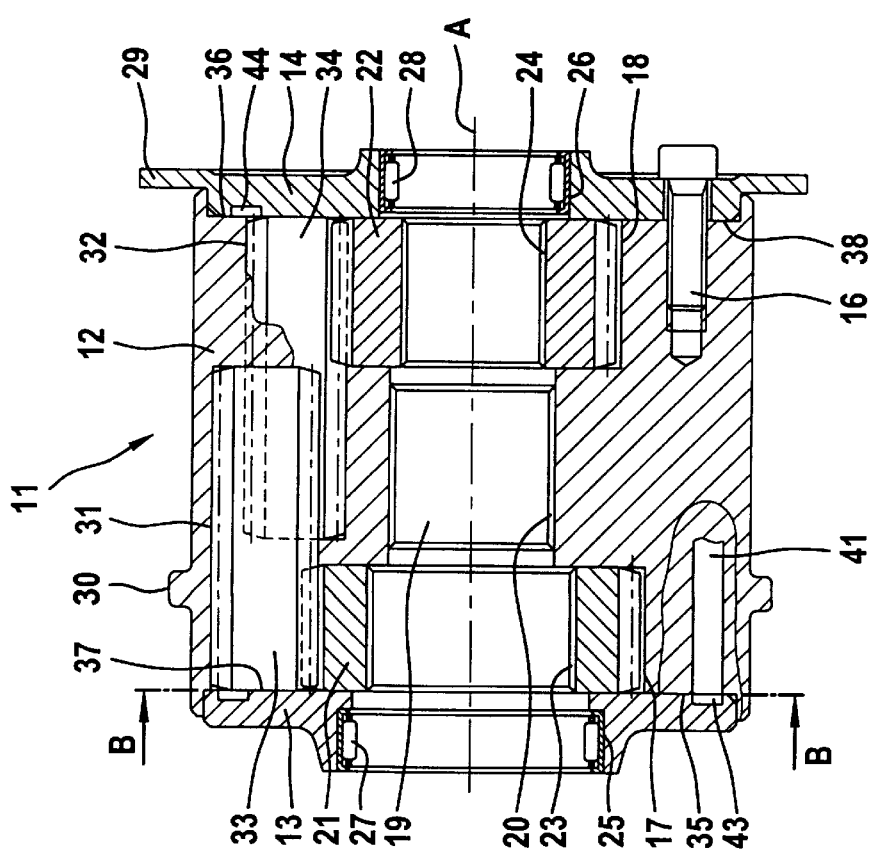
Fig. 2
Fig. 1

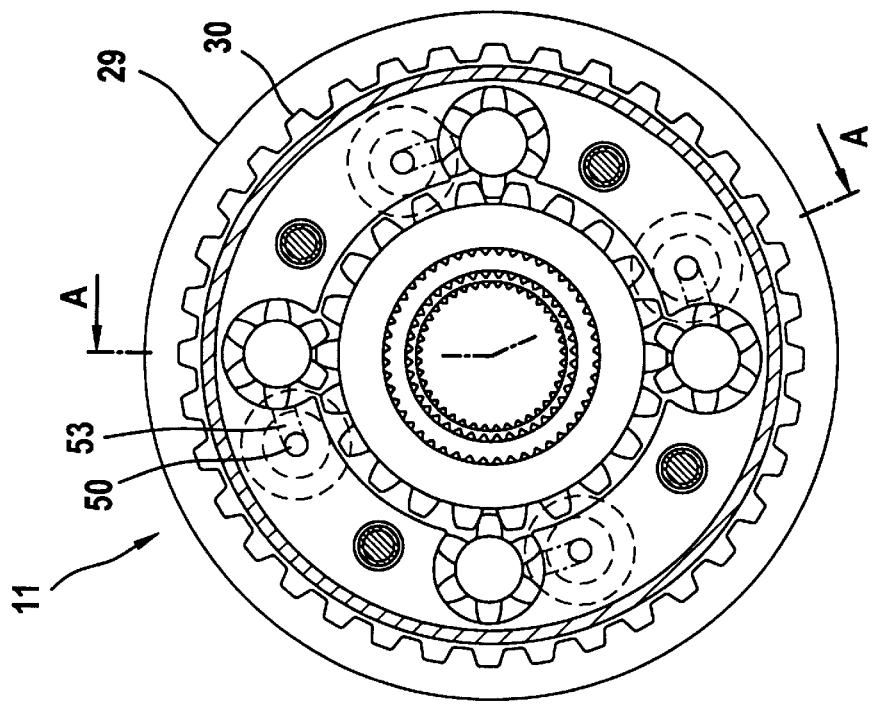
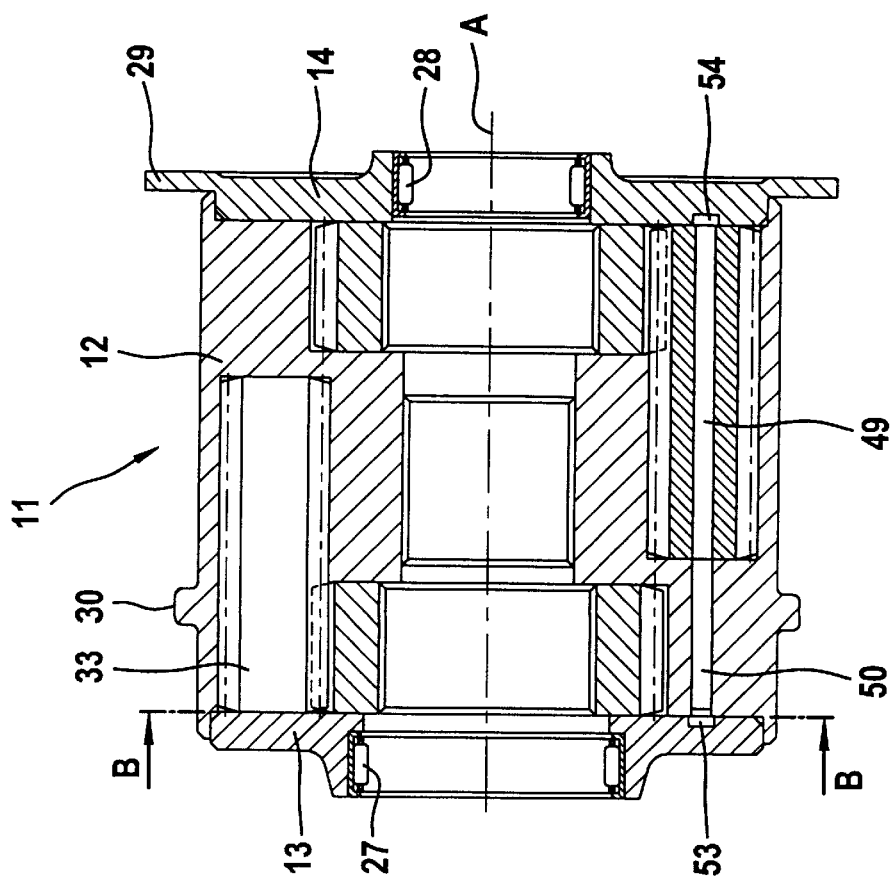
Fig. 8
Fig. 7

MECHANICAL LOCKING DIFFERENTIAL

BACKGROUND OF THE INVENTION

The invention relates to a differential drive having a differential carrier rotatably drivably supported around an axis in a drive housing. Two axle shaft gears are arranged in coaxial bores in the carrier while being supported so as to be rotatable around the axis relative to the differential carrier. A plurality of differential gears are rotatably supported in axis-parallel cylindrical pockets in the differential carrier and rotate with the differential carrier. A first group of differential gears engage one of the axle shaft gears and a second group of differential gears engage the other one of the axle shaft gears. The axle shaft gears and the differential gears are designed as helical gears. The differential gears, on their tooth heads, rotate with contact in the pockets. The differential carrier consists of a central portion comprising the bores for the axle shaft gears and the pockets for the differential gears, and of two cover parts axially closing the bores and the pockets.

Differential drives of the above type have been offered and distributed for some time by the assignee of this application under the name of "Powr-Trak". The friction forces generated in the helical teeth and axial forces acting on the gears and generated between the teeth due to tooth forces cause increased friction losses which reduce the efficiency of the differential drive and thus increase the locking value. The term locking is used when meaning slip limiting in a limited slip differential. However, to avoid impermissible wear, the friction between the teeth and the end faces of the gears and the cover parts and housing bores must not change into dry friction. Therefore, care has to be taken to provide adequate lubrication. If unfavorable conditions prevail such as long periods where the vehicle is out of operation or if the drive housing contains only a small amount of oil, prior art differentials may temporarily experience dry friction during the starting procedure.

In DE 196 16 807 it is proposed to provide the differential carrier with external pressure agent supply means supplying oil via one of the axle shaft gears, and with additional axis-parallel pockets which extend parallel to, and are provided in addition to, the pockets for the differential gears. These features ensure improved lubrication when starting the vehicle after it has been out of operation for some time. Such external pressure agent supply means, with the oil being supplied through a rotating axle shaft, are disadvantageous in that they have a complicated design.

SUMMARY OF THE INVENTION

It is therefore the object of the present invention to improve the lubrication of a differential of the initially mentioned type using simple means. According to a first solution it is proposed that in the central portion, there are provided continuous axis-parallel oil return bores which, by means of connecting grooves in the end faces of the central portion and/or in the inner faces of the cover parts, are connected to the open ends of the pockets emerging at the respective end face. According to a second solution it is proposed that in differential gears of one of the groups, there are provided axial oil return bores which extend over the length of said differential gears, and that in the central portion, there are provided axis-parallel further oil return bores which are connected to the former oil return bores and which emerge from that end face of the central portion, which is remote from said group of differential gears. Both sets of the oil return bores, by means of connecting grooves in the end faces of the central portion and/or in the inner faces of the cover parts, are connected to the open ends of the pockets emerging from the respective end face.

The design measures required for this purpose can be carried out easily and cost-effectively, without the existing basic design being affected thereby or having to be modified in any way. What is required is a number of longitudinal bores in the central portion, which number preferably corresponds to the number of pairs of differential gears; if necessary and desirable, a number of longitudinal bores in one group of differential gears; as well as additional connecting grooves of a type yet to be described in detail, in the central portion or in the cover parts. The effect of the assembly proposed consists in that, in the case of differential movements between the axle shaft gears, two inter-engaging differential gears, because of opposed directions of pitch and opposed directions of rotation, are characterized by identical conveying directions for lubricant inside their pockets in which they can be regarded as some kind of Archimedean screw. The inventive means thus ensure that inside pairs of the pockets penetrating one another, axially conveyed lubricant is transported in a circuit through said grooves at one end of the central portion and through oil return bores extending parallel to the pairs of pockets penetrating one another, and finally through grooves at the opposite end of the central portion, thus avoiding dry running at the most unfavorable end of the pairs of pockets penetrating one another, from where the lubricant is transported away.

According to a first advantageous embodiment, it is proposed that the connection between the ends of the oil return bores and the ends of the pairs of pockets penetrating one another is formed by an annular groove in the end faces of the central portion or the inner faces of the cover. As, during differential movements, the directions of pitch and the directions of rotation of all pairs of differential gears necessarily correspond to one another, one of said grooves is connected to the pressure end of the pairs of pockets and to the suction end of the oil return bores, while the annular groove at the other end of the central portion is connected to the suction end of the pairs of pockets and to the pressure end of the oil return bores. As it is usual for all pairs of pockets and oil return bores to be at the same circumferential distance from one another, the pressure conditions correspond to one another, so that substantially the same amount of oil is distributed through all oil return bores.

According to a second possible embodiment, it is proposed that the connection between the ends of the oil return bores and the ends of the pairs of pockets is formed by individual connecting grooves between a bore and a pair of pockets. Connections of this type differ from simple annular grooves in that they cannot be provided in one single machining operation, but they are advantageous in that they are shorter and comprise a smaller volume, thus permitting a quick pressure build-up and featuring smaller flow losses.

BRIEF DESCRIPTION OF THE DRAWINGS

Preferred details of the invention will be described below with reference to the drawings wherein FIG. 1 shows an inventive differential in a first embodiment in a longitudinal section along the sectional line A—A according to FIG. 2.

FIG. 2 shows the differential according to FIG. 1 in a cross-section according to the sectional line B—B.

FIG. 7 is an inventive differential in a fourth embodiment in a longitudinal section according to section line A—A in FIG. 8.

FIG. 8 shows the differential according to FIG. 7 in a cross-section according to sectional line B—B.

DETAILED DESCRIPTION

Figure 4:
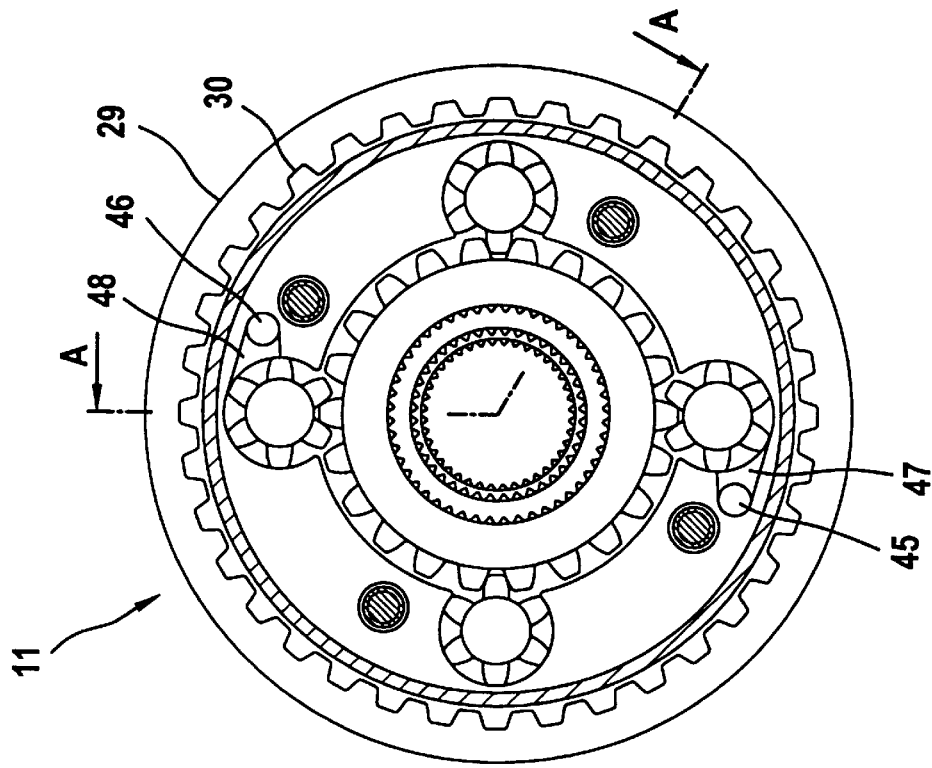
FIG. 4 shows the differential according to FIG. 3 in a cross-section according to sectional line B—B.

Corresponding details in FIGS. 1 to 10 will initially be described jointly. A differential carrier 11 of an inventive differential drive has to be rotatably supported around an axis A by two needle bearings 27, 28 in a differential housing (not illustrated). The differential carrier 11 consists of a central portion 12 and the cover parts 13, 14. A flange 29 is formed on cover part 14. At the central portion 12 there is arranged a ring gear 30 which can serve as a pulse generator for a speed sensor to be arranged inside the drive housing (not illustrated). Whereas the cross-section (FIG. 2) shows first bolts 15 for clamping the cover part 13 to the central portion 12, the longitudinal section (FIG. 1) shows two bolts 16 for connecting the cover part 14 to the central portion 12. It can be seen that the central portion 12 is provided with bores 17, 18 which start from the two ends and which are connected to one another by a central bore portion 19. Inside the bore portion 19 there is provided a set of inner teeth 20 into which there has to be inserted a driveshaft for the differential carrier whose purpose it is to rotatingly drive the differential carrier 11. Such a driveshaft has to be guided in the form of an inner shaft through one of the sideshafts provided in the form of a hollow shaft. In the bores 17, 18 with different diameters there are arranged sideshaft gears 21, 22 which each comprise inner teeth 23, 24 into which sideshafts can be inserted. The cover parts 13, 14 are provided with central through-apertures 25, 26 into each of which there is inserted a needle bearing 27, 28. By means of the needle bearings 27, 28 rotating on the plugged-in sideshafts, the differential carrier is indirectly rotatably supported around the axis A in the drive housing, with the sideshaft, in turn, having to be supported directly in the drive housing. In the central portion there are provided first pockets 31 whose longitudinal axis extends parallel to the axis A, which are open towards a first end face 35 of the central portion 12 and which have a blind ending in the central portion. Pockets 31 penetrate the bore 17 and accommodate differential gears 33 of a first group of differential gears, which differential gears 33 are supported on their tooth heads in the pockets. The differential gears 33 engage the sideshaft gear 21. Only the longitudinal section shows second pockets 32 whose longitudinal axis extends parallel to the axis A, which are open towards the second end face 36 of the central portion 12 and which have blind endings in the central portion. Pockets 32 penetrate the bore 18 and accommodate differential gears 34 of a second group of differential gears, which differential gears 34 are supported on their tooth heads in the pockets. The pockets 32 are provided in the same number and are circumferentially distributed in the same way as the pockets 31, so that there are formed pairs of pockets penetrating one another. In the region of penetration, the differential gears 33 engage the differential gears 34. The pockets 31 and the bore 17 are closed by the cover part 13, whereas the pockets 32 and the bore 18 are closed by the cover part 14. The inner faces 37, 38 of the cover parts 13, 14 thus form stops for the sideshaft gears 21 and 22 respectively and for the differential gears 31 and 32 respectively. When the sideshaft gears 21, 22 rotate in opposite directions relative to one another in the differential carrier 11, the gears of each pair of differential gears 33, 34 also rotate relative to one another in opposite directions. The sideshaft gears 21, 22 and the differential gears 33, 34 comprise helical teeth, with the helical teeth of the two sideshaft gears 21, 22 are in opposite directions of pitch relative to one another. The differential gears of each pair of inter-engaging differential gears 33, 34 also are in opposite directions of pitch. The differential gears 33, 34 provided with helical teeth, when rotating relative to the differential carrier 11, carry out the function of an Archimedean screw in the region where they are in contact in the pockets 31, 32. Because of opposite directions of pitch on the one hand and necessarily opposite directions of rotation on the other hand, there is achieved a conveying direction which is uniform along the pairs of pockets penetrating one another, with the absolute direction being insignificant because the differential carrier 11 is substantially symmetric.

FIGS. 1 and 2 show a differential carrier 11 whose oil conveying system operates in a circuit due to pairs of pockets 31, 32, which system comprises a central portion 12 with oil return bores 41, 42 axially penetrating the latter, and with cover parts 13, 14 provided with annular grooves 43, 44 in the inner faces 37, 38 of the cover parts 13, 14, which annular grooves 43, 44 are arranged at the same distance from the axis as the oil return bores. Any lubricant axially pressed out of the pairs of pockets 31, 32 is collected in a first annular groove of the two annular grooves 43, 44, is returned from there via the oil return bores 41, 42 in the opposite axial direction through the central portion 12 and can be returned via the second annular grooves 43, 44 into the other open end of the pairs of pockets 31, 32.

Figure 3:
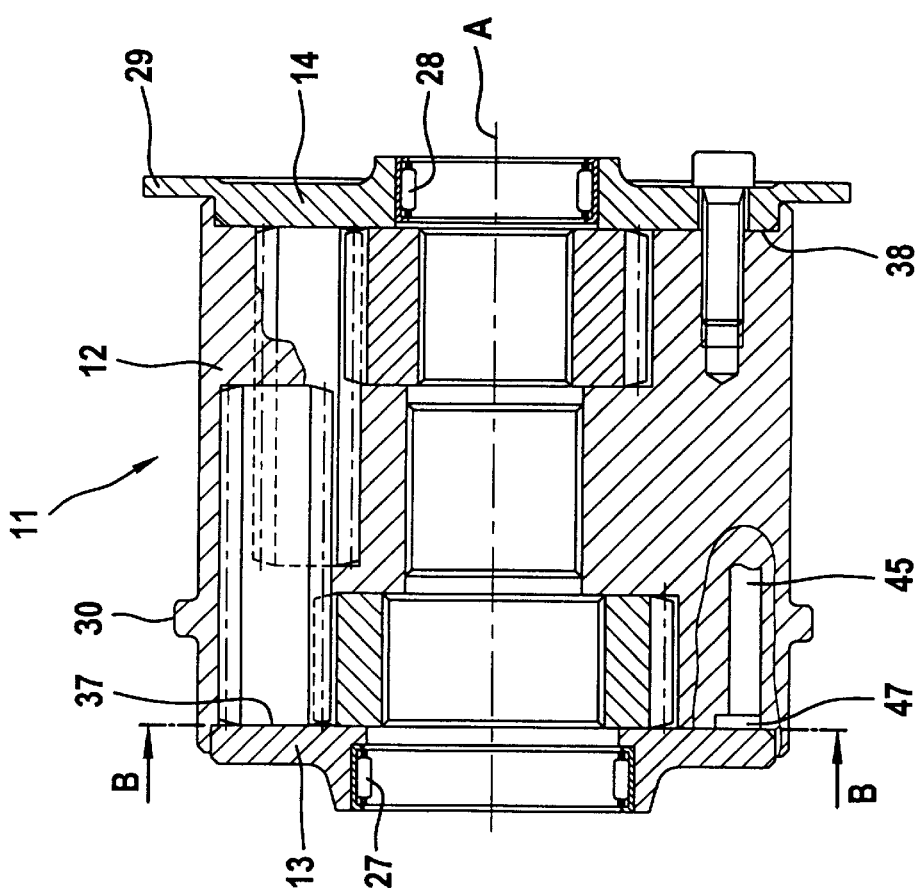
FIG. 3 shows an inventive differential in a second embodiment in a longitudinal section according to sectional line A—A according to FIG. 4.

FIGS. 3 and 4 show a differential carrier 11 with an oil return system of a second embodiment. In the central portion 12, axis-parallel oil return bores 45, 46, by means of connecting grooves 47, 48 in the two end faces of the central portion 12, are connected to the ends of two pairs of pockets. The inner faces 37, 38 of the cover parts 13, 14 are completely planar and delimit the connecting grooves 47, 48 in order to form short connecting channels between the ends of the oil return bores 45, 46 and the open ends of the pairs of pockets 31, 32. Any lubricant axially pressed out of pairs of pockets 31, 32 is returned via the short connecting grooves 47, 48 into the oil return bores 45, 46 in the opposite axial direction through the central portion 12 and from there via identically shaped connecting grooves back into the open ends of the pairs of pockets 31, 32.

Figure 6:
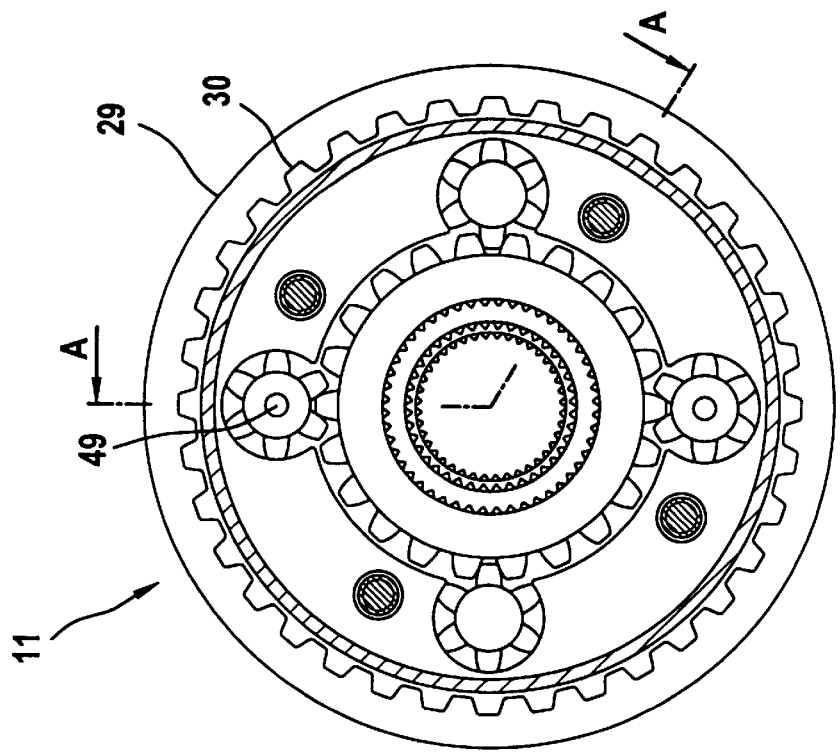
FIG. 6 shows the differential according to FIG. 5 in a cross-section according to sectional line B—B.
Figure 5:
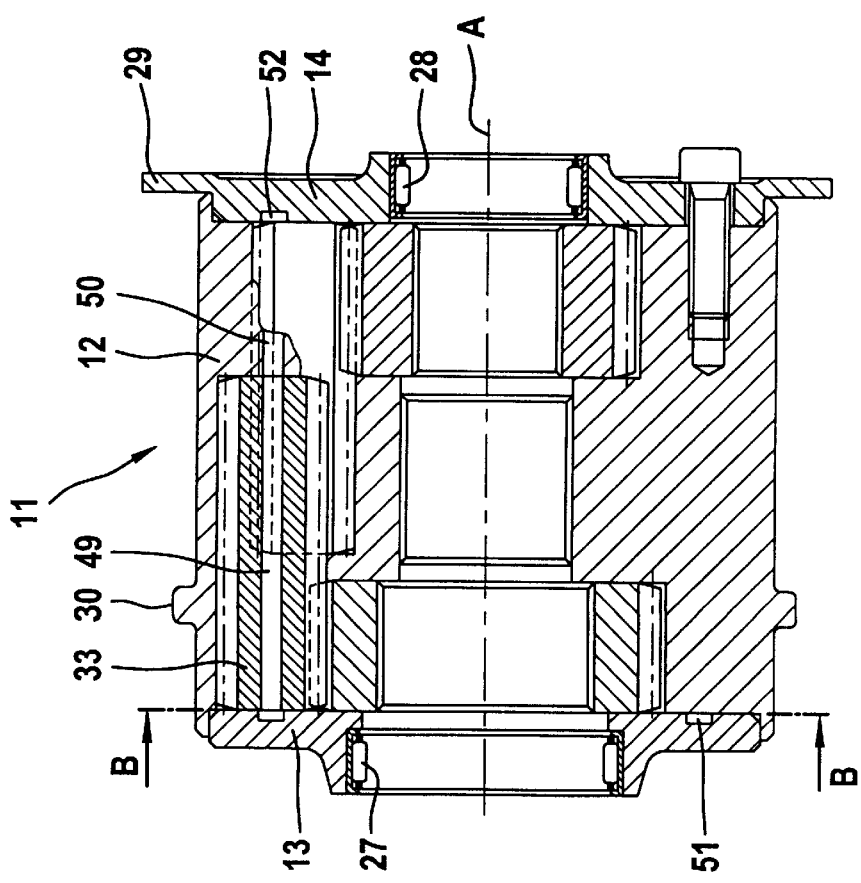
FIG. 5 is an inventive differential in a third embodiment in a longitudinal section according to sectional line A—A in FIG. 6.

FIGS. 5 and 6 show a differential carrier 11 with a third embodiment oil return system. Two of the first differential gears 33 comprise coaxial through-bores 49 which continue at the end of the pockets 31 in the form of bores 50 (one of which is shown in section) in the central portion 12 of the differential carrier 11. The cover parts 13, 14 are each provided with annular grooves 51, 52 which are positioned at a distance from axis A, which distance ensures a connection between the annular grooves and the open ends of all pairs of pockets. The annular grooves connect the pockets 32 of the differential gears 34 not having oil return bores 49 to the pockets 31 of the differential gears having oil return bores 49. Any lubricant axially pressed out of the pairs of pockets 31, 32 is collected in a first annular groove of the two annular grooves 51, 52, is returned from there via the oil return bores 49, 50 in the opposite axial direction through the central portion and can be returned via the second one of the annular grooves 51, 52 into the other open end of the pairs of pockets 31, 32.

FIGS. 7 and 8 show differential carrier 11 with a fourth embodiment oil return system. Two of the second differential gears 34 comprise coaxial through bores 49 which continue at the end of the pockets 31 in the form of bores 50 (one of which is shown in section) in the central portion 12 of the differential carrier 11. The cover parts 13, 14 are each provided with individual connecting grooves 53, 54 which are positioned at a distance from axis A, which distance ensures a connection between the through bores 49, 50 and the open ends of said pairs of pockets. The individual connecting grooves 53, 54, connect the pockets 32 of the differential gears 34 not having oil return bores 49 to the pockets 31 of the differential gears having oil return bores 49. Any lubricant axially pressed out of the pairs of pockets 31, 32 is collected in individual connecting groove 53, 54, is returned from there via the oil return bores 49, 50 in the opposite axial direction through the central portion and can be returned via the second one of the individual grooves 53, 54 into the other open end of the pairs of pockets 31, 32.

Figure 10:
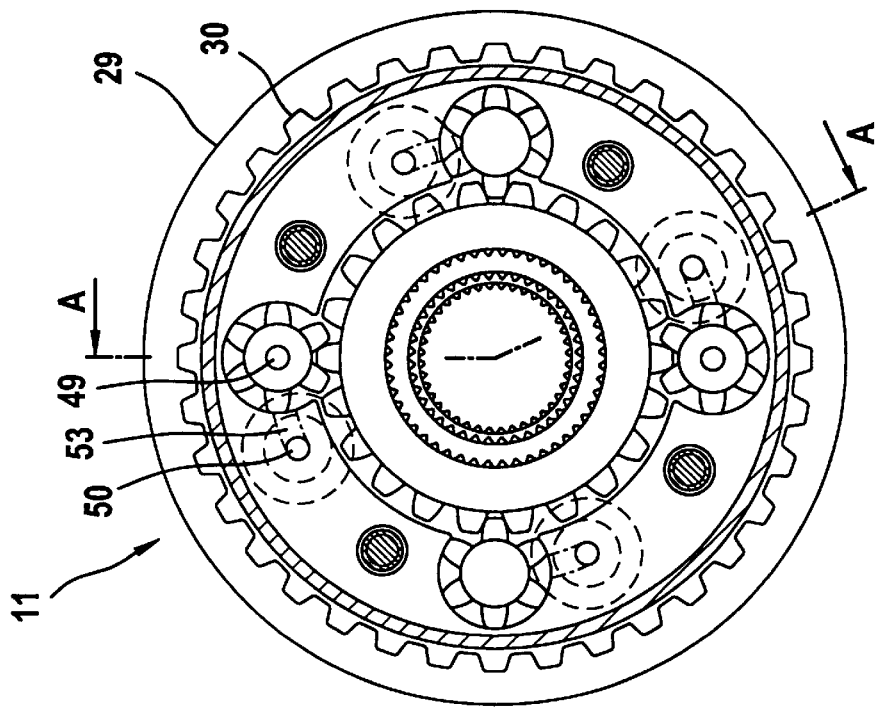
FIG. 10 shows the differential according to FIG. 9 in a cross-section according to sectional line B—B.
Figure 9:
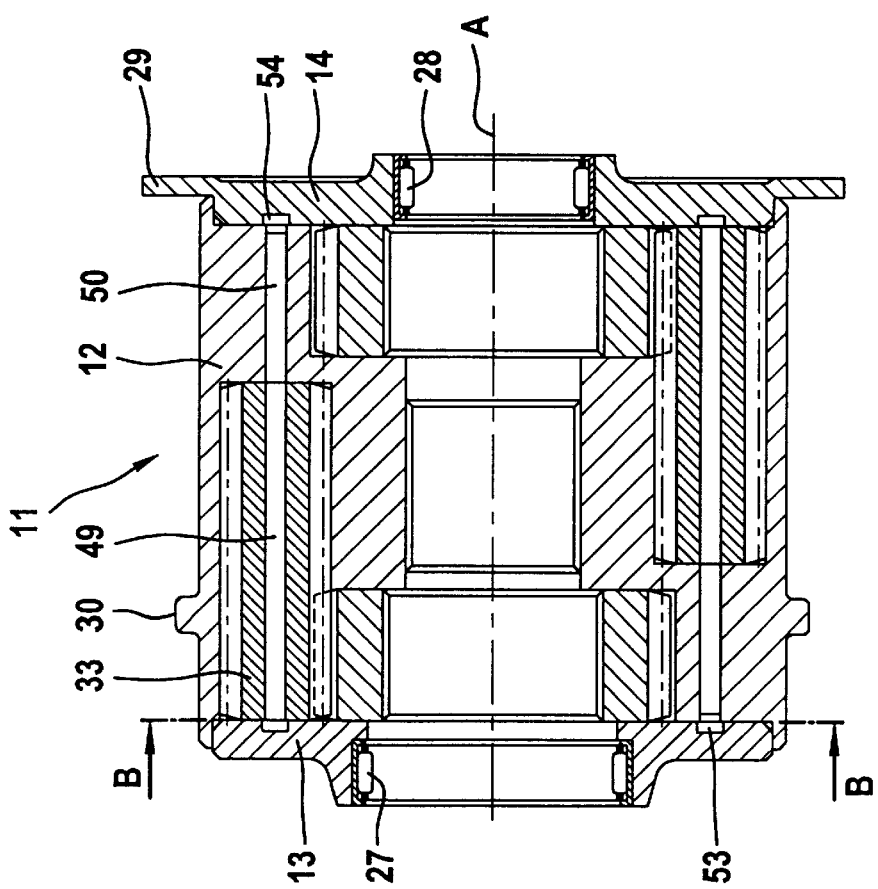
FIG. 9 is an inventive differential in a fifth embodiment in a longitudinal section according to sectional line A—A in FIG. 10.

FIGS. 9 and 10 show differential carrier 11 with a fifth embodiment oil return system. All of the first differential gears 33 and all of the second differential gears 36 comprise coaxial through bores 49 which continue at the end of the pockets 31 in the form of bores 50 in the central portion 12 of the differential carrier 11. The cover parts 13, 14 are each provided with individual connecting grooves 53, 54 which are positioned at a distance from axis A, which distance ensures a connection between the through bores 49, 50 and the open ends of all pairs of pockets. Any lubricant axially pressed out of the pairs of pockets 31, 32 is collected in an individual connecting groove 53, 54, is returned from there via the oil return bores 49, 50 in the opposite axial direction through the central portion and can be returned via another one of the individual connecting grooves 53, 54 into the other open end of the pairs of pockets 31, 32 independently of the sense of rotation.

Preferred embodiments have been disclosed. However, workers in the art will recognize that modifications will come within the scope of this invention. Thus, the following claims should be studied.

What is claimed is:

1. A differential drive comprising:

a differential carrier rotatably drivably supported around an axis in a drive housing, and two axle shaft gears arranged in coaxial bores in said carrier while being supported so as to be rotatable around said axis relative to said carrier, and a plurality of differential gears rotatably supported in axis-parallel cylindrical pockets in said carrier and which rotate with said carrier, with a first group of said differential gears engaging one of said axle shaft gears and with a second group of said differential gears engaging the other one of said axle shaft gears, with said axle shaft gears and said differential gears being helical gears having tooth heads and with said differential gears, on said tooth heads, rotating with contact in said pockets, and said carrier having a central portion having end faces and comprising said bores for said axle shaft gears and said pockets for said differential gears, and two cover parts having inner faces and axially closing said bores and said pockets; and said central portion having continuous axis-parallel oil return bores which, by means of connecting grooves in at least one of said end faces of said central portion and said inner faces of said cover parts, are connected to open ends of said pockets emerging at the respective end face, so that a closed circuit for the flow of oil is formed by said pockets, said connecting grooves, and said oil return bores.

2. A differential drive according to claim 1, wherein connections between ends of said oil return bores and said ends of said pockets are formed by an annular groove in at least one of said end faces of said central portion and said inner faces of said cover parts.

3. A differential drive according to claim 1, wherein connections between ends of said oil return bores and ends of said pockets are formed by individual connecting grooves in at least one of said end faces of said central portion and said inner faces of said cover parts.

4. A differential drive comprising:

a differential carrier rotatably drivably supported around an axis in a drive housing and two axle shaft gears arranged in coaxial bores in said carrier while being supported so as to be rotatable around said axis relative to said carrier, and a plurality of differential gears rotatably supported in axis-parallel cylindrical pockets in said carrier and which rotate with said carrier, with a first group of said differential gears engaging one of said axle shaft gears and a second group of said differential gears engaging the other one of said axle shaft gears, with said axle shaft gears and said differential gears being helical gears having tooth heads and with said differential gears, on said tooth heads, rotating with contact in said pockets, and with said carrier having a central portion having end faces and comprising said bores for said axle shaft gears and said pockets for said differential gears, and two cover parts having inner faces and axially closing said bores and said pockets; and in said differential gears of one of said groups, there are provided first axial oil return bores which extend along the length of said differential gears, and in said central portion there are provided axis-parallel second oil return bores which are connected to said first oil return bores and emerge from one of said end faces of said central portion, which is remote from said one group of differential gears, with both of said sets of oil return bores, by means of connecting grooves in at least one of said end faces of said central portion and said inner faces of said cover parts, being connected to open ends of said pockets emerging at the respective end face, so that a closed circuit for the flow of oil is formed by said pockets, said connecting grooves, and said oil return bores.

5. A differential drive according to claim 4, wherein the connections between the ends of said oil return bores in said differential gears and the ends of said oil return bores in said central portion on the one hand and the ends of said pockets on the other hand are formed by an annular groove in at least one of the end faces of said central portion and said inner faces of said cover parts.

6. A differential drive according to claim 4, wherein connections between the ends of said oil return bores in said differential gears and the ends of said oil return bores in said central portion on the one hand and the ends of said pockets on the other hand are formed by individual connecting grooves in at least one of the end faces of said central portion and said inner faces of said cover parts.

7. A differential drive according to claim 5, wherein said pockets penetrate one another in pairs and the number of oil return bores is smaller than the number of pairs of pockets penetrating one another.

8. A differential drive according to claim 4, wherein in said differential gears of the other one of said groups, there are provided further axial oil return bores which extend along the length of said differential gears, and are connected to said axis-parallel second oil return bores, with both said further oil return bores and said axis-parallel oil return bores, by means of said connecting grooves in at least one of said end faces of said central portion and said inner faces of said cover parts, being connected to open ends of said pockets emerging at the respective end face.

\* \* \* \* \*